United States Patent
Eiriksson et al.

(10) Patent No.: US 11,025,752 B1
(45) Date of Patent: Jun. 1, 2021

(54) METHOD TO INTEGRATE CO-PROCESSORS WITH A PROTOCOL PROCESSING PIPELINE

(71) Applicant: Chelsio Communications, Inc., Sunnyvale, CA (US)

(72) Inventors: Asgeir Thor Eiriksson, Sunnyvale, CA (US); Wael Noureddine, Santa Clara, CA (US)

(73) Assignee: Chelsio Communications, Inc.

( * ) Notice: Subject to any disclaimer, the term of this patent is extended or adjusted under 35 U.S.C. 154(b) by 1412 days.

(21) Appl. No.: 14/804,007

(22) Filed: Jul. 20, 2015

(51) Int. Cl.
*H04L 29/06* (2006.01)
*H04L 29/08* (2006.01)

(52) U.S. Cl.
CPC ............ *H04L 69/08* (2013.01); *H04L 69/321* (2013.01)

(58) Field of Classification Search
CPC .............................. H04L 69/08; H04L 69/321
See application file for complete search history.

(56) References Cited

U.S. PATENT DOCUMENTS

| | | | |
|---|---|---|---|
| 6,078,733 A * | 6/2000 | Osborne | G06F 13/128 709/212 |
| 6,708,223 B1 | 3/2004 | Wang et al. | |
| 7,050,039 B1 * | 5/2006 | McGloin | G06Q 30/02 345/105 |
| 7,133,914 B1 | 11/2006 | Holbrook | |
| 7,945,705 B1 | 5/2011 | Eiriksson et al. | |
| 2004/0042487 A1 | 3/2004 | Ossman | |
| 2004/0165592 A1 | 8/2004 | Chen et al. | |
| 2005/0147126 A1 | 7/2005 | Qiu et al. | |
| 2005/0190787 A1 | 9/2005 | Kuik et al. | |
| 2005/0216597 A1 | 9/2005 | Shah et al. | |
| 2005/0259678 A1 | 11/2005 | Guar | |
| 2006/0174012 A1 * | 8/2006 | Yamazaki | H04L 69/16 709/227 |
| 2008/0263323 A1 * | 10/2008 | Mould | G06F 9/3836 712/42 |
| 2010/0158026 A1 * | 6/2010 | Valmikam | H04L 67/2823 370/401 |

* cited by examiner

*Primary Examiner* — Tim T Vo
*Assistant Examiner* — Herve Iradukunda
(74) *Attorney, Agent, or Firm* — Lee & Hayes, P.C.

(57) ABSTRACT

A network adaptor (or NIC) is equipped with multi-level protocol processing capability and is implemented with a protocol processing pipeline that has multiple tap points to enable the integration of co-processors to operate with the NIC. The capability leverages the protocol processing pipeline and all the existing NIC software while at the same time enabling the integration of value added co-processors to customize and enhance the NIC capabilities.

18 Claims, 9 Drawing Sheets

| Message Type<br>TAP A port 4 | Message Encoding | Bit vector<br>4321 |
|---|---|---|
| CPL_TX_DATA | 0x0C | 0010 |
| CPL_TX2RX_DATA | 0x31 | 0001 | b)

| Message Type<br>TAP A port 1 | Message Encoding | Bit vector<br>4321 |
|---|---|---|
| CPL_TX2RX_DATA | 0x31 | 0100 | c)

| Message Type<br>TAP B port 1 | Message Encoding | Bit vector<br>4321 |
|---|---|---|
| CPL_TX2RX_DATA | 0x31 | 1000 |

*Figure 7*

METHOD TO INTEGRATE CO-PROCESSORS WITH A PROTOCOL PROCESSING PIPELINE

TECHNICAL FIELD

The present invention relates to the integration of co-processors and a protocol processing pipeline that may operate at Layer 1 to Layer 7 of the OSI reference model.

BACKGROUND

A network adaptor (e.g., a Network Interface Controller (NIC)) may be, for example, network interface circuitry, such as on a PCI card connected to a host computer or other local device, an ASIC or an FPGA, via a host bus (such as a PCI bus or ARM ACE bus) or an IP block within an SoC (System On a Chip) that is connected to the system bus via a host bus. The network adaptor is typically used to couple the host CPU to a packet network through at least one interface, called a port. NIC circuitry has been an area of rapid development as advanced packet processing functionality and protocol offload have become requirements for so called "smart NICs". In a previous U.S. Pat. No. 7,945,705 we have described how a co-processor is inserted into a protocol offload NIC processing pipeline using a dedicated SPI4.2 interconnect bus. We refer to this type of co-processor insertion as a data-path TAP point. Advantages of using such TAP points include being able to leverage the software that is available with the NIC while increasing flexibility and including value-added features.

Commercially, a NIC provider typically also provides a complete suite of software that has been included into the software release on different operating systems such as Linux, FreeBSD, or Microsoft Windows. Value added and extensibility features such as virtualization, deep packet inspection, access control and intrusion detection and prevention (ACL/IDS/IPS), encapsulation and de-capsulation, management interfaces, de-duplication, compression/decompression, encryption/decryption can be inserted into the NIC processing pipeline while preserving the software investment and can be inserted without affecting the released software.

TAP points also allow separating the control path from the data path, and operating on one or the other independently, e.g. processing the control plane in the co-processor while transferring payload through the system bus.

SUMMARY

A network adaptor (or NIC) is equipped with multi-level protocol processing capability and is implemented with a protocol processing pipeline that has multiple tap points to enable the integration of co-processors to operate with the NIC. The capability leverages the protocol processing pipeline and all the existing NIC software while at the same time enabling the integration of value added co-processors to customize and enhance the NIC capabilities.

BRIEF DESCRIPTION OF FIGURES

FIGS. 3 and 3-1 are a block diagram illustrating the egress pipeline.

FIGS. 4 and 4-1 are block diagrams illustrating the ingress pipeline.

DETAILED DESCRIPTION

With the advent of SoC IP configurations of a protocol offload NIC there is an opportunity to generalize the TAP points as described in U.S. Pat. No. 7,945,705 and to enable different TAP points at different layers of the network protocol stack, e.g. optionally add L5-L7 processing in addition to the above application enabled by U.S. Pat. No. 7,945,705.

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

In U.S. Pat. No. 7,945,705, it is described how protocol encapsulation (therein, denoted as CPL for "Chelsio Protocol Language") is used to direct messages to the co-processor via the SPI4.2 bus and how the CPL encapsulation is used to steer the messages injected from the co-processor. In accordance with the present invention, the mechanism is generalized so that data and control messages can exit and enter the protocol processing pipeline at various generalized TAP points. The TAP points can be at any of the layers L2-L7 of the ISO reference protocol stack, and the data-flow allowed includes, for example, ingress-to-ingress loopback, ingress-to-egress pass-through, egress-to-egress loopback, and egress-to-ingress pass-through. Unicast of the CPL messages, multi-cast, and broadcast may be supported. This means that a CPL message arriving at a TAP point may be switched to one, to many, or to all possible destinations of the particular TAP point.

The CPL messages include control plane messages and data plane messages, where the control plane messages configure the hardware, indicate progress, and indicate completions of tasks. The CPL data plane messages are used to carry payload. A TAP point can be configured such that all CPL data plane messages that arrive at the TAP point are switched to the co-processor before being injected by the co-processor back into the processing pipeline, while all the control plane messages are switched to the next stage in the processing pipeline, thereby bypassing the co-processor. This separation has the advantage of simplifying the co-processor design and implementation, as the co-processor may only need to know how to process the subset of CPL messages that carry payload and the co-processor only needs to handle the traffic load generated by payload carrying messages. In a similar manner a TAP point can be configured such that all the control plane messages are switched to the co-processor while all the data plane messages are switched to the next stage in the processing pipeline and do not go through the co-processor. This has the advantage of being able to move the control processing from the host computer to a co-processor, thereby potentially simplifying the host computer or being able to replace the host computer with a different type of devices, for example an ASIC, an FPGA, or other type of programmable logic device that is well suited to data plane processing while it might not be as well suited for control plane processing. The co-processor in this case might employ a conventional host processor.

Figure 1:
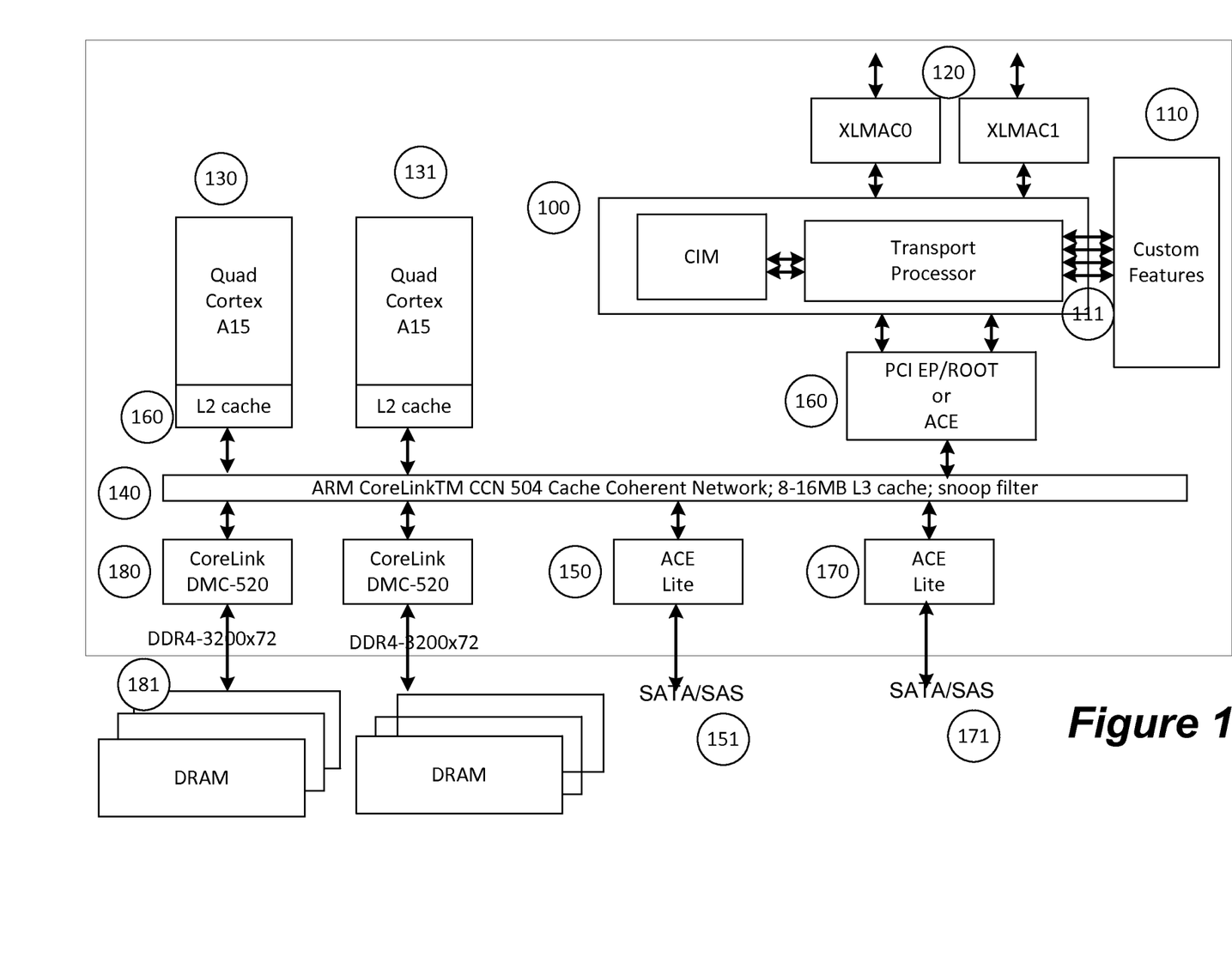
FIG. 1 is an example SoC with the protocol offload NIC IP with TAP points.

Refer now to FIG. 1 that shows an example SoC with the NIC IP referred to as the CIM+Transport Processor 100 with the TAP points connecting to value added features referred to as custom features 110. The example SoC includes two quad core Cortex A15 ARM processors 130 and 131 connected together over the ARM CoreLink™ CCN network 140 and the processors are also connected via the CoreLink™ to DRAM 181 and to SATA/SAS controllers 150 170. The DRAMs 181 are connected to the CoreLink™ via DMC-520 controllers 180. The SATA/SAS controllers 151 and 171 are typically connected to the CoreLink™ via an ACE Lite controller 150 and 170. Finally, the NIC is connected to CoreLink™ either via a PCIe endpoint/root, or via an ACE or ACE Lite controller 180. The NIC has custom features integrated via TAP Points 111, and finally the NIC is connected via Ethernet MAC to the interface of the SoC where it is connected to Ethernet 120.

Figure 2:
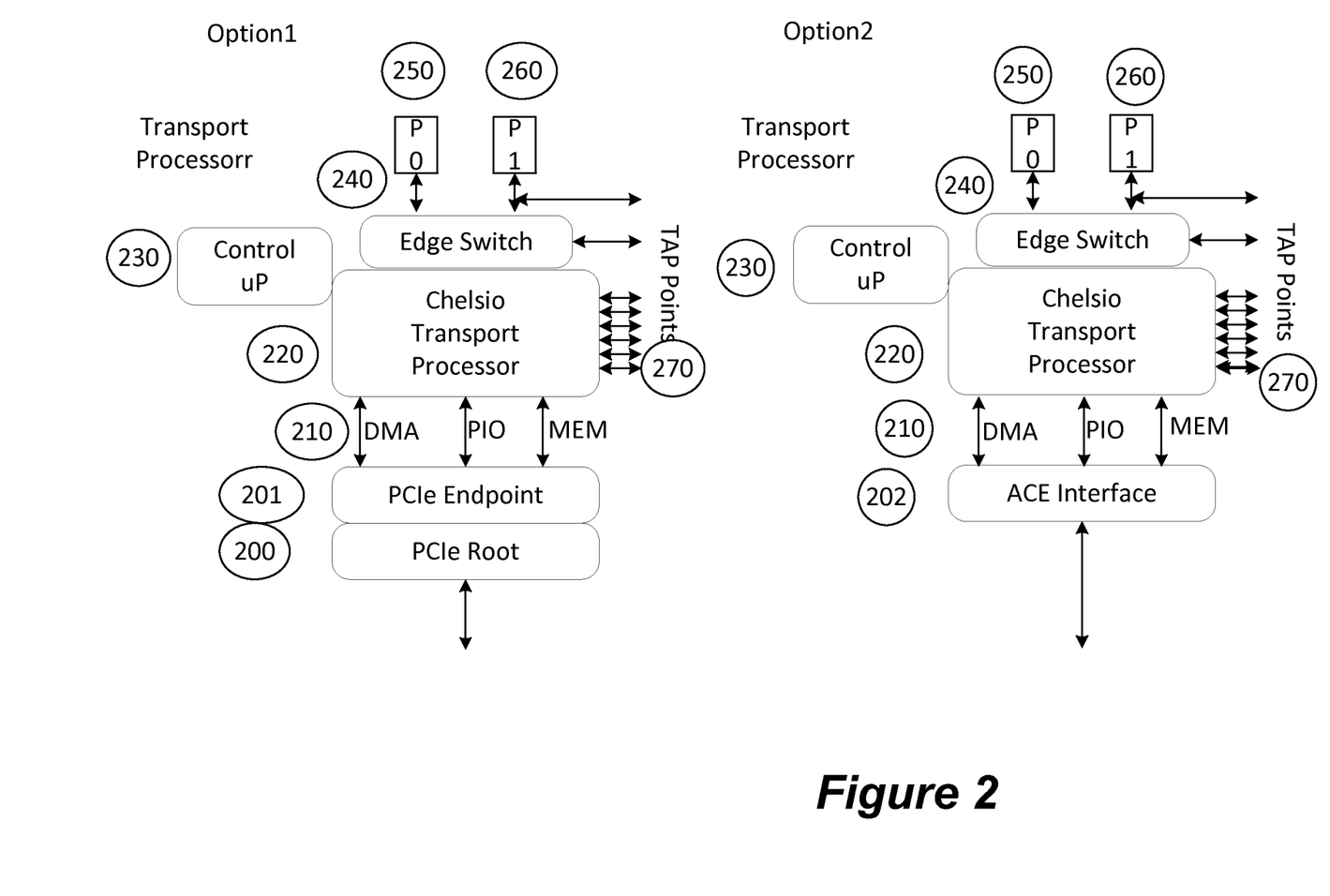
FIG. 2 illustrates two examples of connecting the SoC NIC IP to the SoC system bus.

Refer now to FIG. 2 that shows two options for coupling the NIC IP to the CoreLink™ system network. The first example is via a PCI Endpoint 201 and PCI root 200 and the second example is via an ACE bus or ACE Lite bus interface module 202. The Chelsio Transport Processor communicates with the system network using DMA, PIO, and memory access MEM 210. The Control uP 230 implements the control plane processing required by the IP and the Edge Switch 240 is a switch that is integrated with the IP. The P0 250 and P1 260 blocks are two Ethernet MAC interfaces. Finally the TAP Points 270 are connected to the IP at different stages of the processing pipeline to the Edge Switch and between the Edge Switch and MAC.

Figure 3:
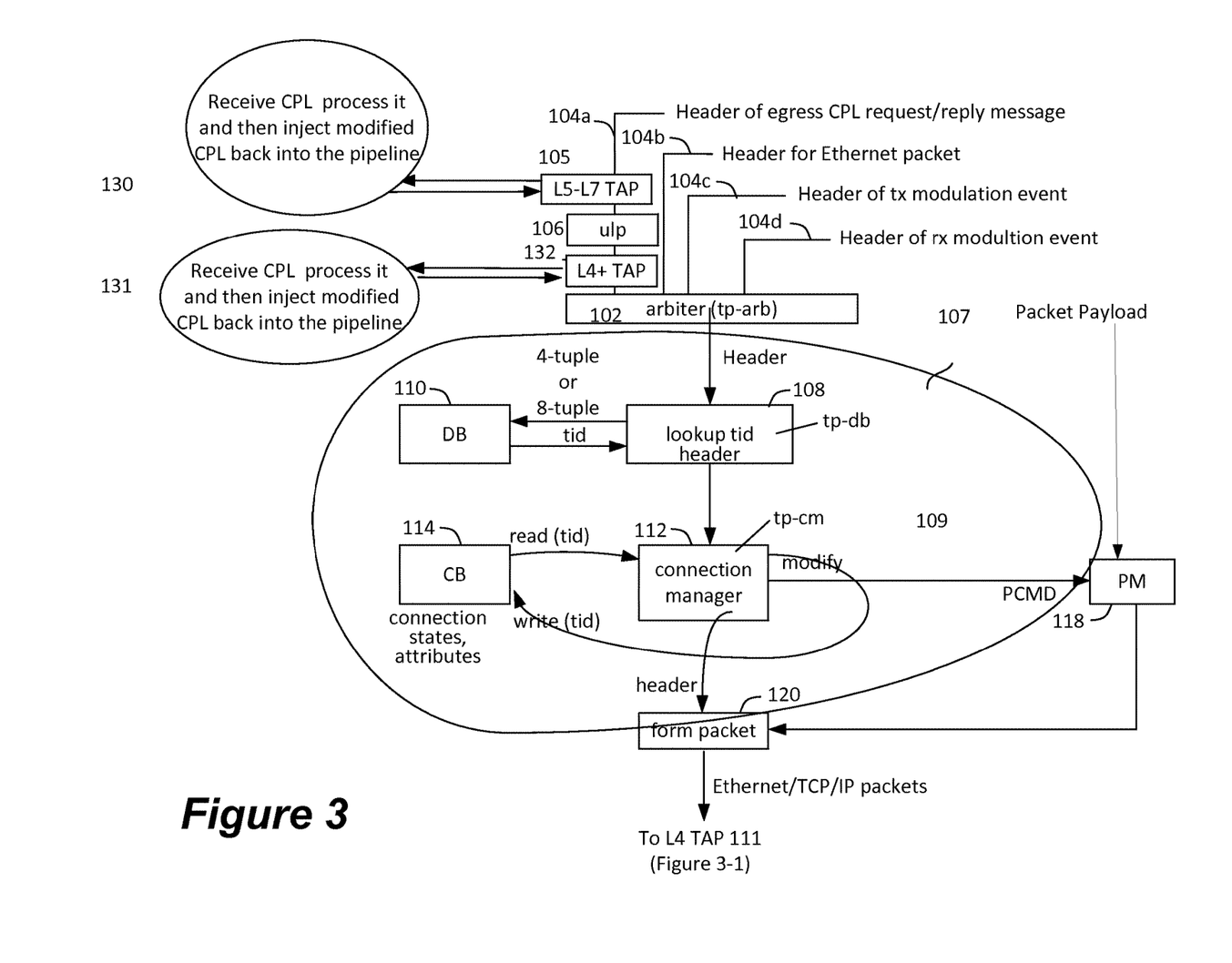
Figure 31:
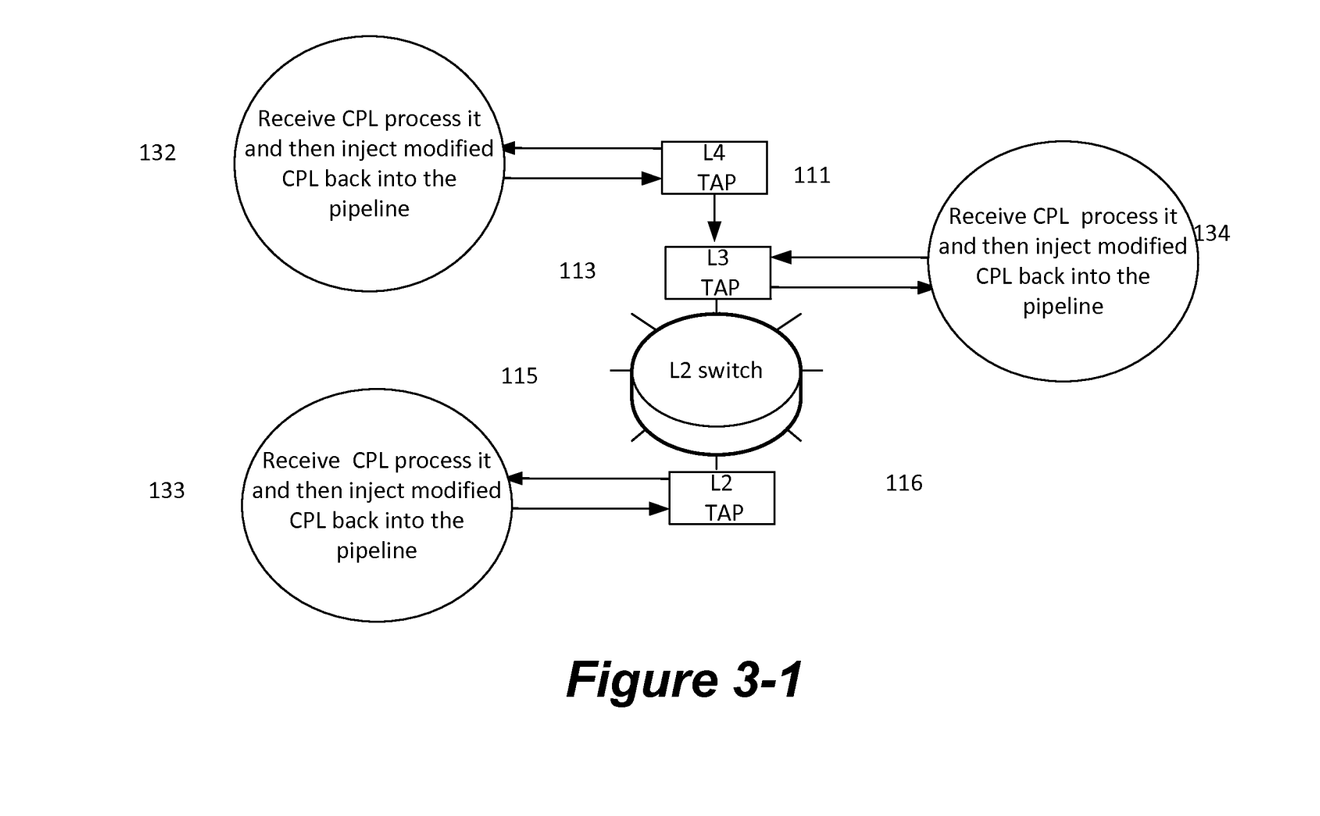

Refer now to FIGS. 3 and 3-1 that show the egress processing pipeline with TAP points inserted at different layers of the protocol stack. The TAP points are individually optional and one or more can be included depending on the desired custom features in the SoC. When a particular co-processor is not required, it is not included in the pipeline, and when a particular TAP point is not required it is replaced with a point to point connection. For example when the L5-L7 TAP point 105 is not required the CPL message entry point 104a is directly connected to the ulp 106. When CPL messages (i.e., a payload encapsulated by a CPL header) arrive from the SoC system via the PCIe bus or ACE interface module 104a, the CPL messages are optionally switched to the L5-L7 co-processor 130 before proceeding into the processing pipeline 102. For offloaded TCP connections (i.e., the NIC is handling TCP protocol processing rather than a TCP protocol stack that is part of the host CPU operating system), the CPL messages carry TCP payload and no L2, L3 or L4 headers, since the L2, L3 and L4 headers are formed on the NIC as part of the offloaded protocol processing. This is therefore an opportune point in the pipeline to operate on the application payload, e.g. perform ACL/IDS/IPS, de-duplications, compression/de-compression, encryption/decryption, etc.

The packet next proceeds into PDU encapsulation block ulp 106—e.g., TLS and/or iSCSI and/or iWARP and the L4+ TAP point 132 is an opportune point to operate on the Protocol Data Unit (PDU). For example, the PDU header can be audited for ACL/IPS/IPS purposes, the PDU can be encrypted, and the header can be transformed, for example, translating from one format to a different format.

The packet is processed and an Ethernet encapsulated TCP packet is formed 120 and the L4 TAP 111 is an opportune time to process layer L4 packet in co-processor 132. An example of Layer 4 processing that may be performed by co-processor 132 is TLS encryption where the L4 payload is encrypted.

The packet then proceeds to the L3 TAP 113 and examples of Layer 3 processing in co-processor 134 include NAT and IPsec encryption.

The packet then proceeds through the L2 switch and to the L2 TAP 116. Examples of Layer 2 processing in co-processor 133 include encapsulations such as VXLAN, GENEVE, and NVGRE.

Figure 4:
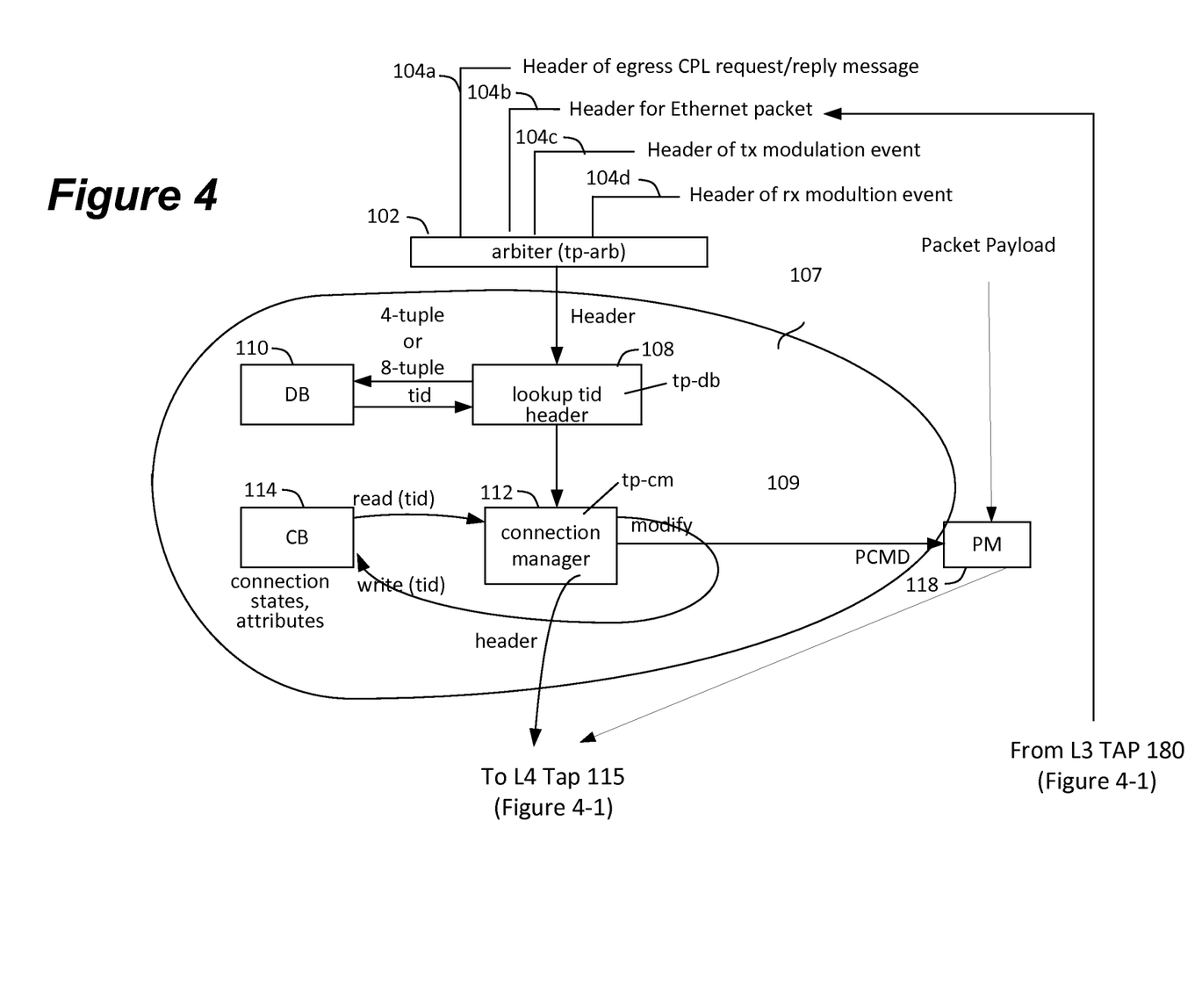
Figure 41:
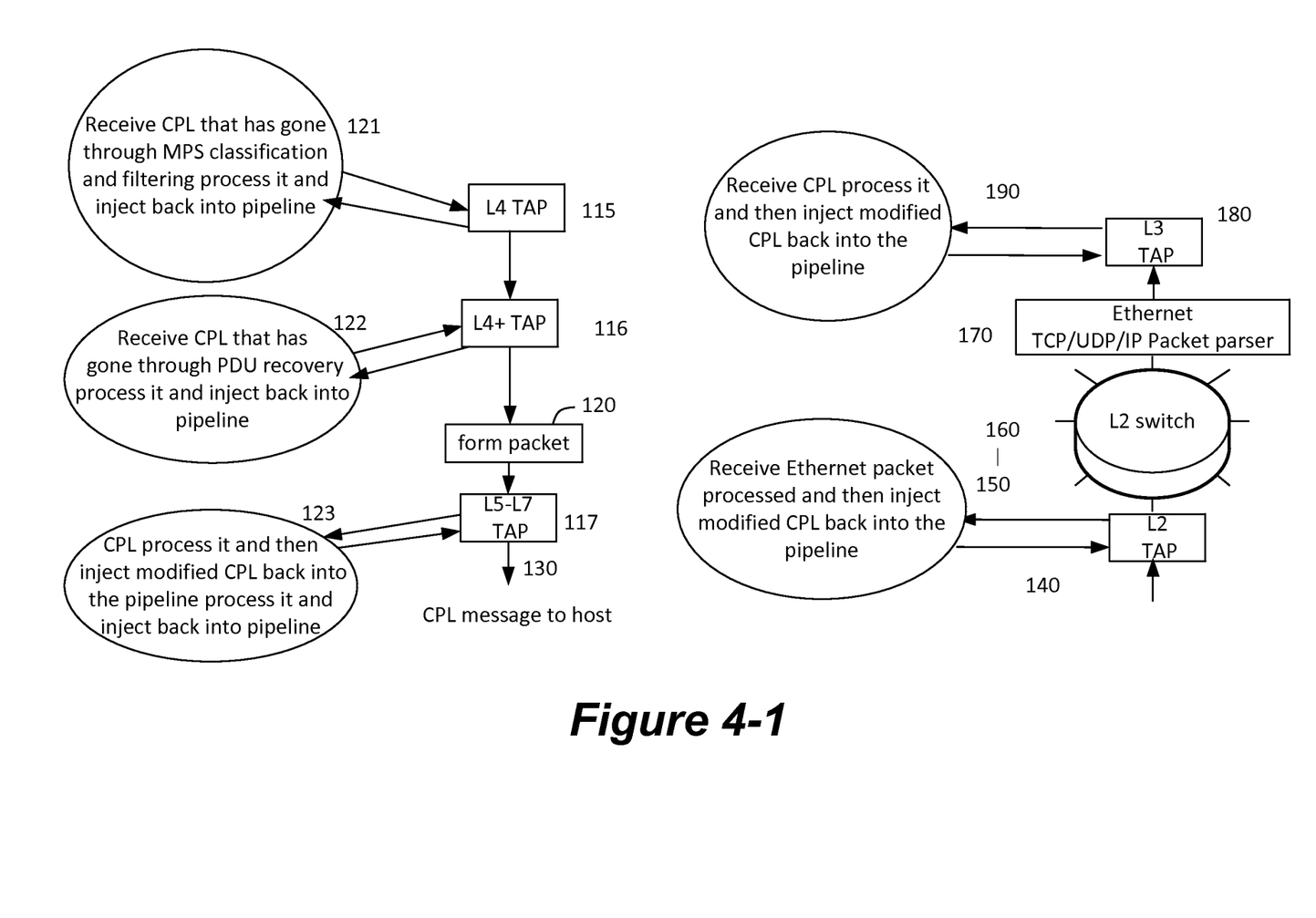

Refer now to FIGS. 4 and 4-1 that show the steps performed by a NIC processing pipeline for an ingress packet with TAP points inserted at different layers of the protocol stack. When Ethernet packets arrive 140, they optionally go to the L2 TAP point 150 before going to the L2 switch 160. The co-processor connected to this TAP point 150 can for example remove VXLAN, GENEVE, NVGRE encapsulation.

The packets then proceed to the Ethernet TCP/UDP/IP packet parser 170 before optionally proceeding to the L3 TAP 180. The co-processor 190 connected to this TAP point 180 can, for example, perform IPsec decryption and/or NAT processing.

The packets then are injected into the processing pipeline 104c and proceed to the L4 TAP 115. The co-processor 121 connected to this TAP point 115 can for example perform TLS decryption.

When L4 carries a PDU in the payload, the PDU's are recovered next in the processing pipeline and the L4+ TAP point 116 is where it is opportune to inject PDU header auditing co-processing, performed by co-processor 122 for ACL/IPS/IPS purposes, PDU decryption and the header transformation for example translating from one format to a different format.

The packets then are injected into the L5-L7 TAP 117 and are then injected into system memory via the PCIe bus or ACE interface module. The L5-L7 TAP co-processor 123 is for co-processors that operate on application payload, e.g. perform ACL/IDS/IPS, de-duplications, compression/decompression, encryption/decryption.

Figure 5:
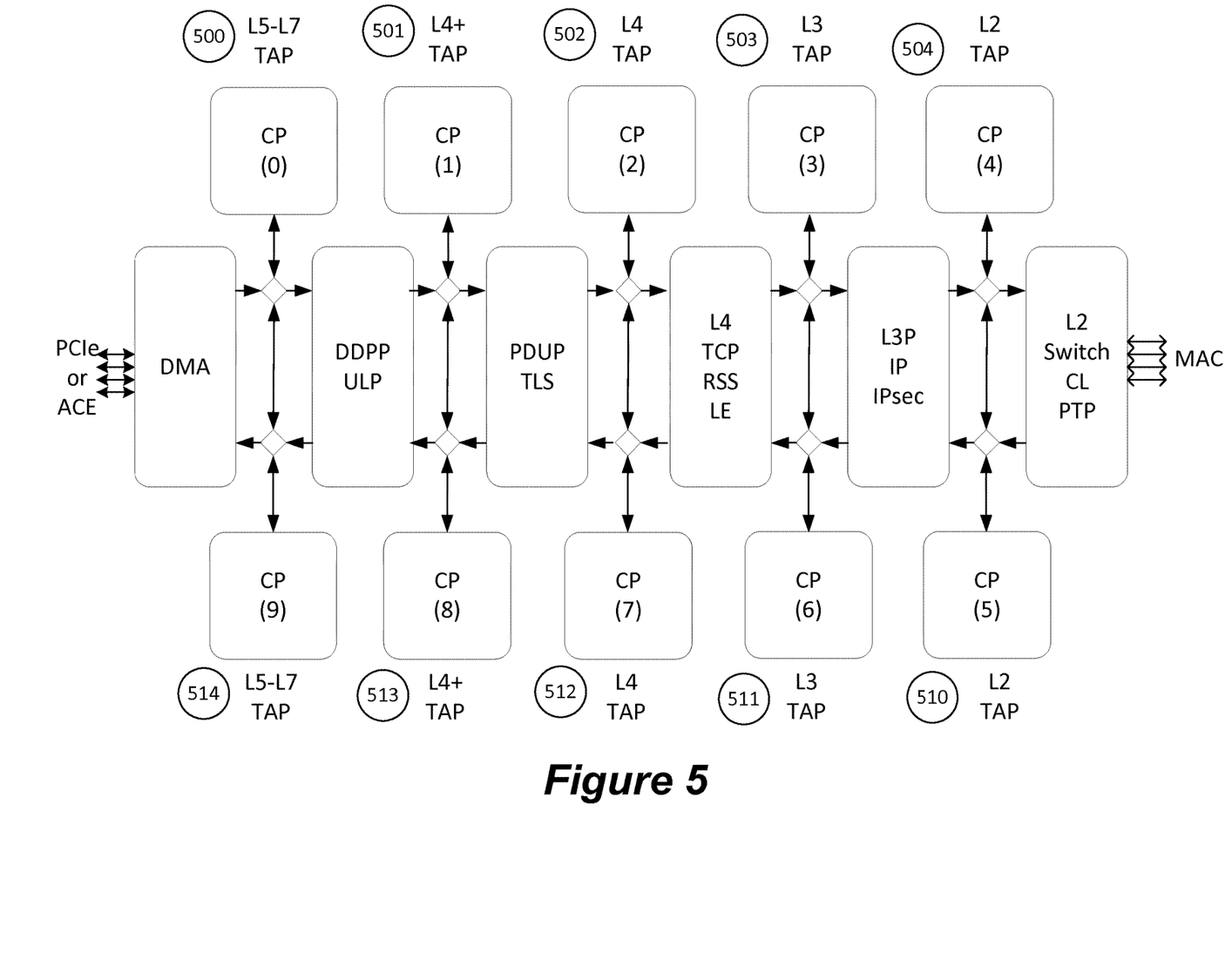
FIG. 5 is a block diagram illustrating TAP points at each pipeline stage.

Refer now to FIG. 5 that summarizes the relationship of the pipeline steps and the TAP points. The co-processors CP(0), CP(1), . . . , CP(9) are optional as are the TAP points that are connected to them. A particular co-processor is instantiated in an SoC only when it is required, and the TAP point is only instantiated when it is required, and when neither is required the TAP point is replaced with a point-to-point connection between processing stages. The egress TAP points and co-coprocessors from FIG. 3 are shown again as CP(0)-CP(4) 500, 501, 502, 503 and 504. The ingress TAP points and co-processors from FIG. 4 are shown again as CP(5)-CP(9) 510, 511, 512, 513, and 514.

Figure 6:
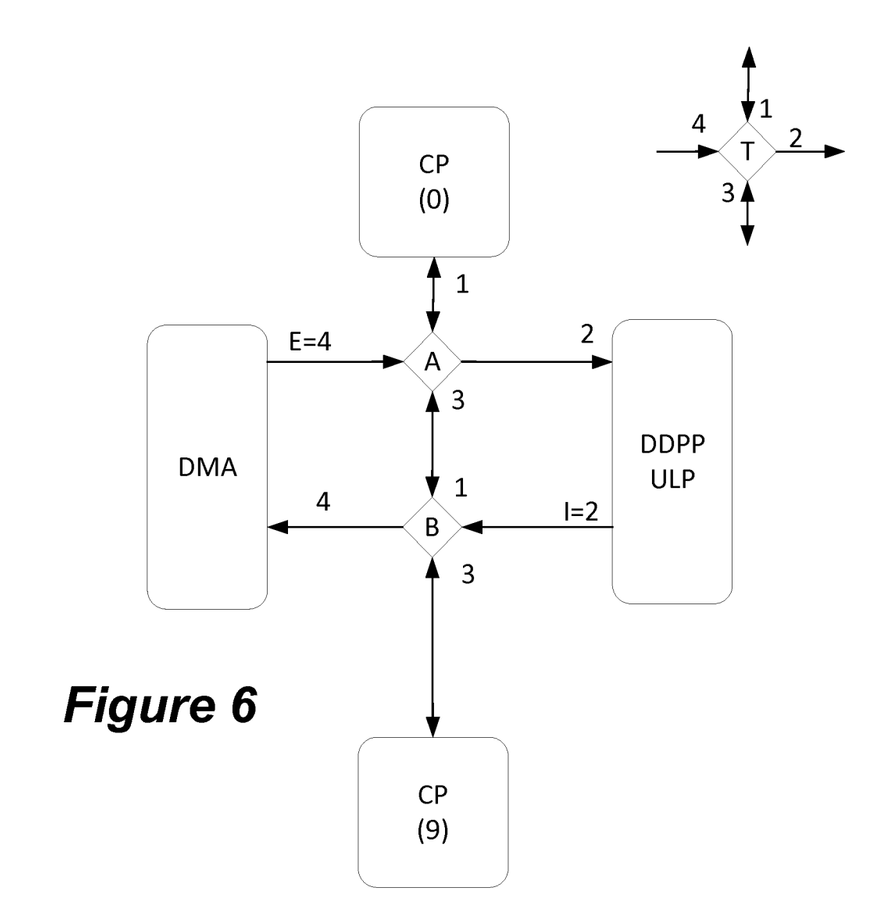
FIG. 6 illustrates an example switch block for exit/entry into the protocol processing pipeline.

Refer now to FIG. 6 that shows the port number convention used to switch messages into and out of TAP points. A TAP point has 4 ports numbered 1-4, and CPL packets can arrive on each of the ports and packets can leave on each of the ports; the ports are bi-directional. The ports are numbered in clockwise fashion starting at the top port. A CPL message going in the egress direction and going to the next stage in the pipeline will arrive on port E=4 and proceed out of port 2 to the next stage in the egress pipeline. A CPL message that goes to CP(0) will instead be switched to port 1 and enter CP(0). A CPL message coming from CP(0) and arriving on port 1 can be switched to port 2 or 3. A CPL message coming from CP(0) or E=4 and looping around will be switched to port 3 in TAP point marked A in the Figure and will be switched to port 4 in the TAP point marked B in the Figure.

Figure 7:
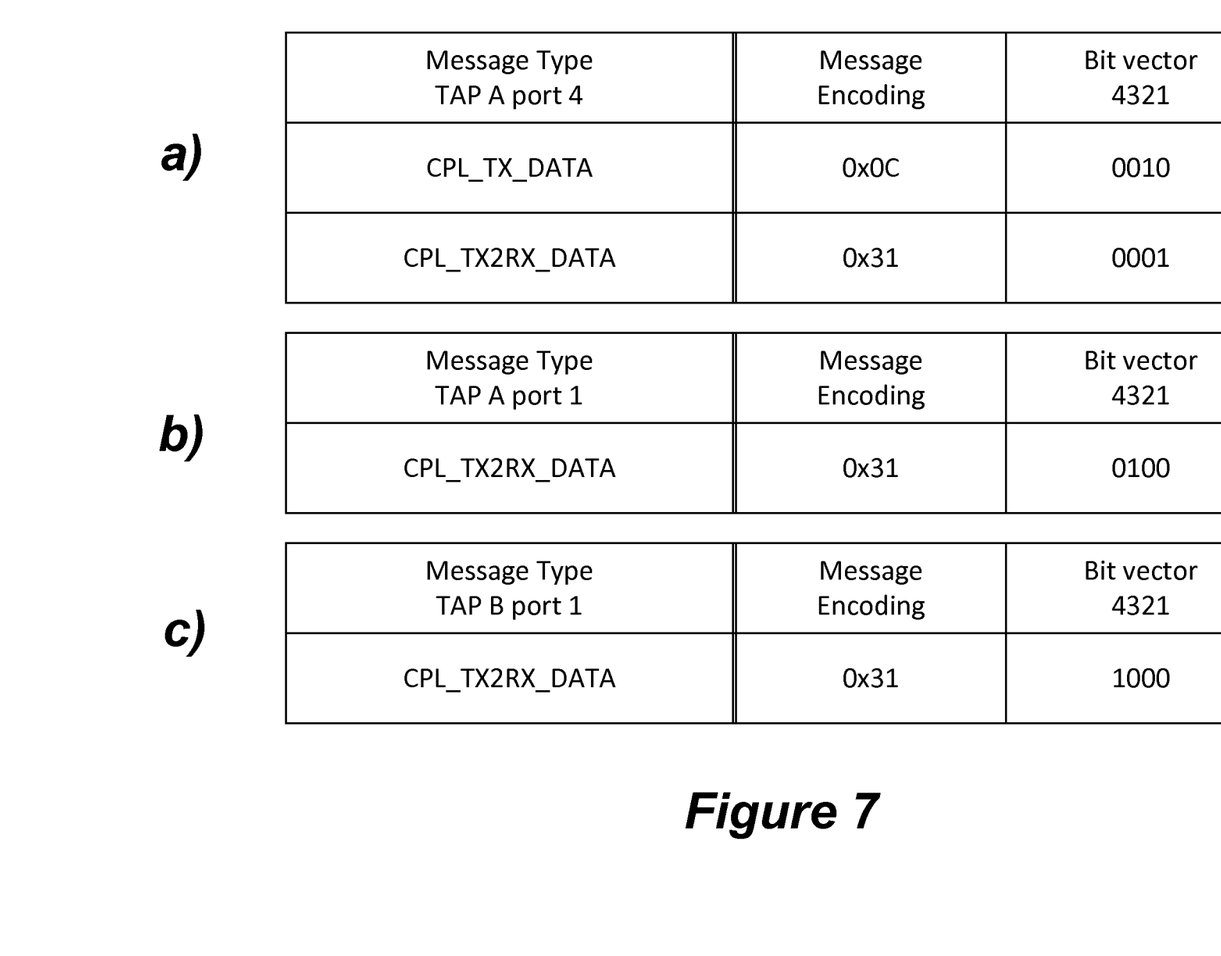
FIG. 7 illustrates an example switch block configuration.

Refer now to FIGS. 7A to 7C that show an example switch box configuration for the TAP point switch box shown in FIG. 6. The message type is encoded as 8-bits in this example and the switching action is determined by looking up, in a per-port table, the port destination for the arriving message type. The port destination is a bit vector and a copy of a message is sent to each of the ports with a value 1 in the bit vector. Three switching table fragments are shown in the Figure. In FIG. 7A, the CPL_TX_DATA message with type 0x0C is switched to port 2, because bit 2 is set in the bit-vector, when it arrives on port 4 in TAP A. The CPL_TX2RX_DATA message with type 0x31 is switched to port 1 in TAP A which is CP(0). We assume that when this message type comes back from CP(0) on port 1 it is still encoded as CPL_TX2RX_DATA and based on the FIG. 7B, it is therefore switched to port 3 in TAP A., Finally when it arrives on port 1 in TAP B, based on FIG. 7C, it is switched to port 4, and thereby it completing the egress-to-egress loopback action with CP(0) getting an opportunity to process the payload while the CPL message is looped back.

Each of tap points in FIG. 5 that are used can be configured in the manner shown in FIGS. 7A to 7C and can be used as a flexible framework to extend the operation of the basic protocol offload egress and ingress pipelines while retaining software NIC compatibility. The configuration can, for example, proceed in similar fashion to the one described in the U.S. Pat. No. 7,945,705 that uses PIO accesses or it can use CPL messages that have the effect of writing per-port switching tables in in the different TAP points being used.

We have thus described a generalization of TAP points for an interface device that offloads protocol processing, including advantageously enabling of different TAP points at different layers of the network protocol stack.

What is claimed is:

1. A method of operating an interface device configured for communication with a local device via a local bus of the local device, wherein the interface device is further configured to offload from the local device protocol processing of messages communicated among the local device and peer devices via a network according to a first multi-layer communication protocol, to handle protocol processing among the local device and the peer devices according to the first multi-layer communication protocol, the method comprising:

by the interface device, offloading the protocol processing from the local device by performing, on behalf of the local device, operations according to the first communication protocol;

within the interface device, generating configuration messages regarding intra-device communication among a plurality of portions of the interface device, the various portions of the interface device collectively performing operations to handle the protocol processing on behalf of the local device according to the first multi-layer communication protocol; and wherein
the configuration messages are communicated among the plurality of portions of the interface device according to a local protocol that is different from the first multi-layer communication protocol; and
the configuration messages include at least an indication, for each of at least some of the configuration messages, of whether a message associated with that configuration message is to be directed to at least one coprocessor in the interface device;

processing the indications and, based thereon, selectively providing messages to the at least one coprocessor in the interface device.

2. The method of claim 1, wherein:
selectively providing messages to the at least one coprocessor in the interface device includes, for a message provided to the at least one coprocessor, selecting to provide that message to the at least one co-processor based on an indication of protocol type and information present in that message.

3. The method of claim 1, wherein:
selectively providing messages to the at least one coprocessor in the interface device includes providing at least one data plane message to the at least one coprocessor while not providing a corresponding control plane message to the at least one coprocessor.

4. The method of claim 1, wherein:
selectively providing messages to the at least one coprocessor in the interface device includes providing at least one control plane message to the at least one coprocessor while not providing a corresponding data plane message to the at least one coprocessor.

5. The method of claim 1, further comprising:
by at least one of the plurality of portions of the interface device, processing a configuration message provided by the at least one coprocessor.

6. The method of claim 1, wherein:
the at least one coprocessor is embodied in a programmable logic device.

7. The method of claim 1, wherein:
the indications are embodied in a vector and the selectively providing step is according to at least contents of the vector.

8. The method of claim 1, wherein:
the selectively providing step is according to at least tables stored in the interface device.

9. The method of claim 8, further comprising:
by the interface device, receiving instructions from the local device to modify the tables stored in the interface device.

10. An interface device configured for communication with a local device via a local bus of the local device, wherein the interface device is further configured to offload from the local device protocol processing of messages communicated among the local device and peer devices via a network according to a firstmulti-layer communication protocol, to handle protocol processing among the local device and the peer devices according to the first multi-layer communication protocol, the interface device configured to:

offload the protocol processing from the local device by performing, on behalf of the local device, operations according to the first communication protocol;

within the interface device, generate configuration messages regarding intra-device communication among a plurality of portions of the interface device, the various portions of the interface device collectively performing operations to handle the protocol processing on behalf of the local device according to the first multi-layer communication protocol; and wherein
the configuration messages are communicated among the plurality of portions of the interface device according to a local protocol that is different from the first multi-layer communication protocol; and the configuration messages include at least an indication, for each of at least some of the configuration messages, of whether a message associated with that configuration message is to be directed to at least one coprocessor in the interface device;

process the indications and, based thereon, selectively provide messages to the at least one coprocessor in the interface device.

11. The interface device of claim 10, wherein the interface device being configured to selectively provide messages to the at least one coprocessor in the interface device includes, for a message provided to the at least one coprocessor, the interface device being configured to select to provide that message to the at least one co-processor based on an indication of protocol type and information present in that message.

12. The interface device of claim 10, wherein the interface device being configured to selectively providing messages to the at least one coprocessor in the interface device includes the interface device being configured to provide at least one data plane message to the at least one coprocessor while not providing a corresponding control plane message to the at least one coprocessor.

13. The interface device of claim 10, wherein the interface device being configured to selectively provide messages to the at least one coprocessor in the interface device includes the interface device being configured to provide at least one control plane message to the at least one coprocessor while not providing a corresponding data plane message to the at least one coprocessor.

14. The interface device of claim 10, further configured to:

by at least one of the plurality of portions of the interface device, process a configuration message provided by the at least one coprocessor.

15. The interface device of claim 10, wherein:

the at least one coprocessor is embodied in a programmable logic device.

16. The interface device of claim 10, wherein:

the indications are embodied in a vector and being configured to selectively provide messages to the at least one coprocessor in the interface device is according to at least contents of the vector.

17. The interface device of claim 10, wherein:

being configured to selectively provide messages to the at least one coprocessor in the interface device is according to at least tables stored in the interface device.

18. The interface device of claim 17, wherein the interface device is further configured to:

receive instructions from the local device to modify the tables stored in the interface device.

* * * * *